Patented Nov. 20, 1928.

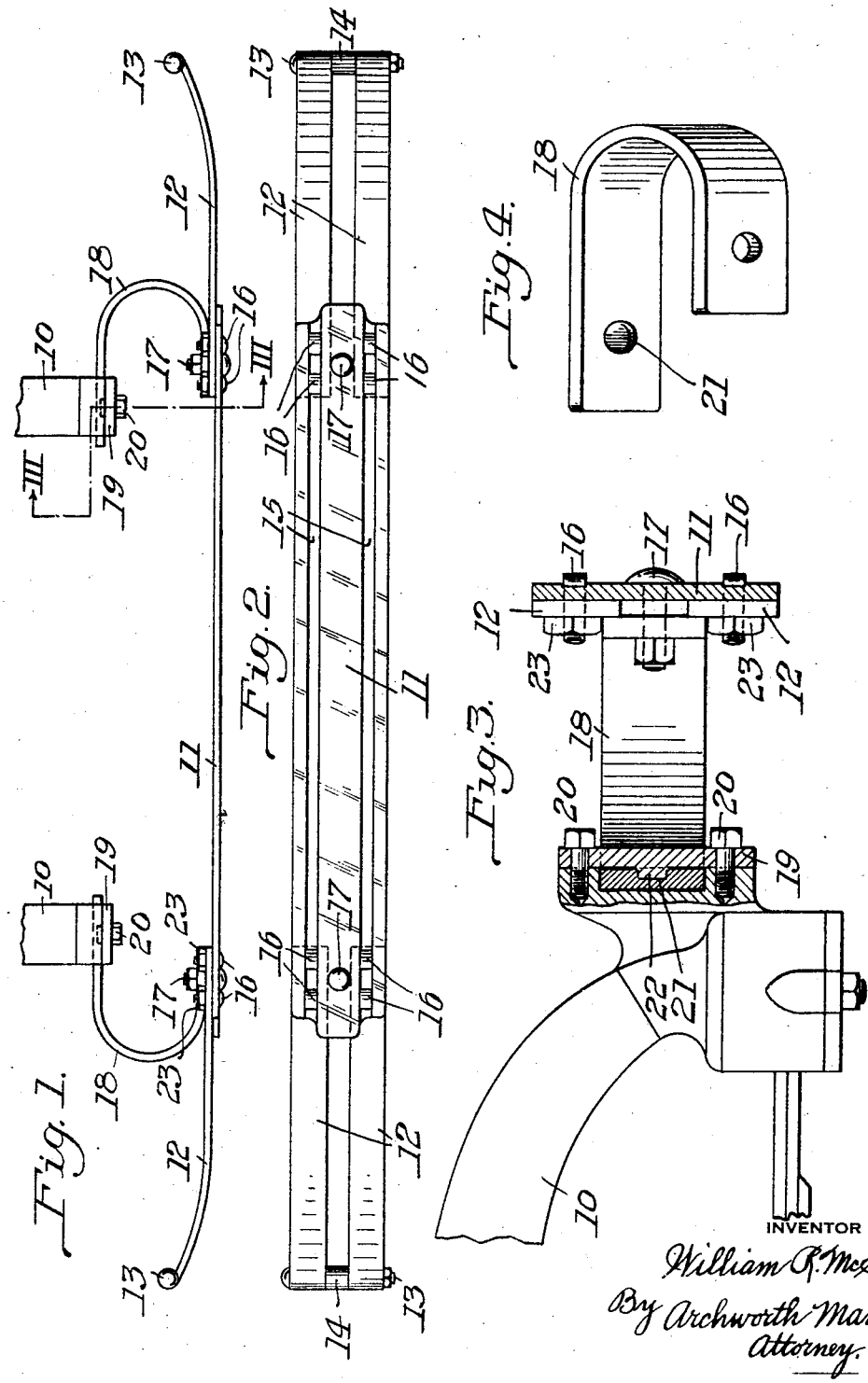

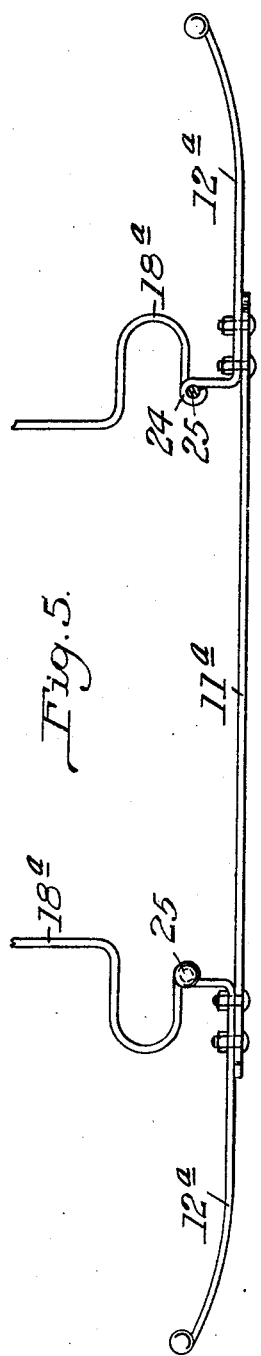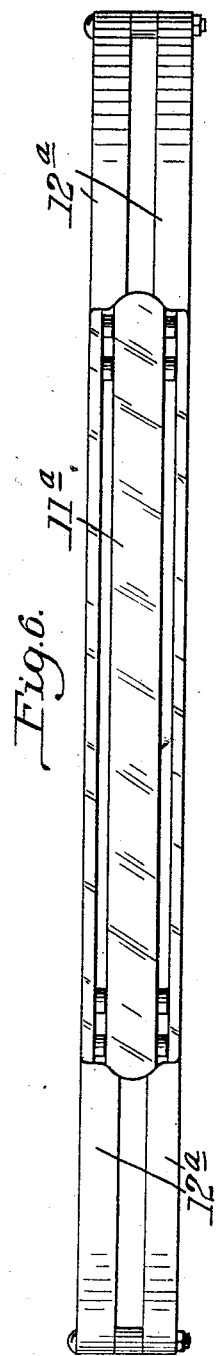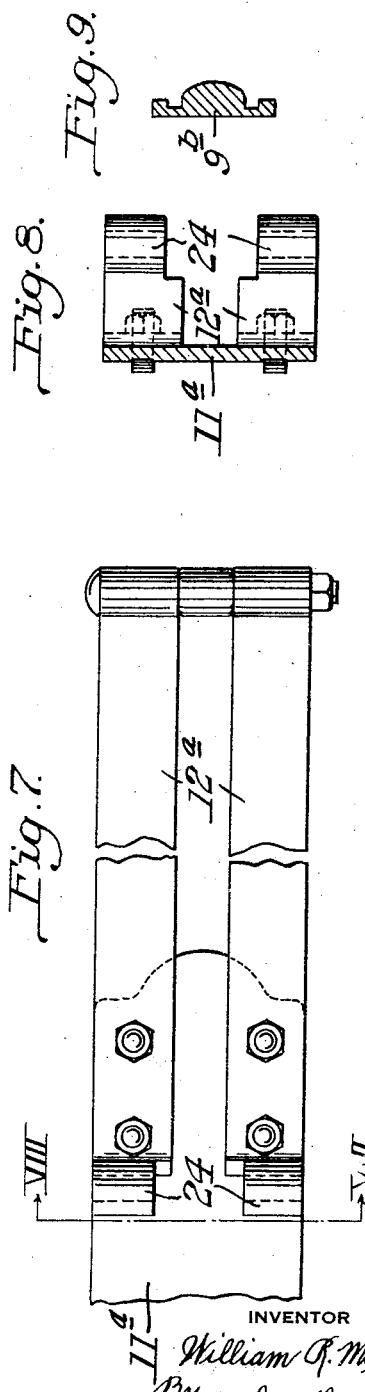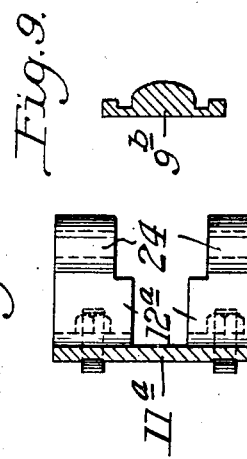

1,692,088

UNITED STATES PATENT OFFICE.

WILLIAM R. McGOWEN, OF McKEES ROCKS, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed May 24, 1928. Serial No. 280,186.

My invention relates to automobile bumpers, such as are employed upon the front and rear ends of automobiles for absorbing the shocks of impacts or collisions.

One object of my invention is to provide an impact structure which may be made in sections, and which possesses advantages not found in bumpers of the prior art, in the way of strength, utility, decorative appearance, cheapness of manufacture, etc.

Another object of my invention is to provide an impact structure wherein one section may be of standardized size and form, and with which other sections of various weights and sizes may be alternatively employed to form a complete structure.

A further object of my invention is to provide an improved means for connecting impact structures to vehicle frames or other supporting members.

Still another object of my invention is to simplify and improve generally upon the bumper structures of the prior art.

Some of the forms which my invention may take are shown in the accompanying drawing, wherein Figure 1 is a plan view of a bumper structure embodying my invention; Fig. 2 is a front elevational view thereof; Fig. 3 is a sectional view, on an enlarged scale, taken on the line III—III of Fig. 1; Fig. 4 is a perspective view of one of the bracket arms of Fig. 1; Fig. 5 is a view similar to Fig. 1, but showing a modified form of bumper structure; partially in section; Fig. 6 is a front elevational view of the device of Fig. 5; Fig. 7 is a rear elevational view, on an enlarged scale, of a portion of the apparatus of Fig. 5; Fig. 8 is a view taken on the line VIII—VIII of Fig. 7, and Fig. 9 is a cross-sectional view of a modified form of intermediate impact section.

Referring now to Figs. 1 to 4, I show side frame members 10 of a vehicle (not shown) to which the bumper structure is connected for protection of the vehicle parts.

The impact structure is composed of an intermediate section 11 and end sections 12. The intermediate section 11 may be of a single piece of spring steel that is finished in a decorative manner, as by grinding, polishing and plating, while the end sections 12 are each composed of spring metal bars which are curled at their outer ends to form eyes, so that they may be secured together by means of bolts 13, spacing rings or washers 14 being interposed between the outer ends of the bars. These end sections 12 may be finished simply by dipping them to provide a black japan coating thereon, thus avoiding the necessity of performing expensive operations of grinding, polishing and plating. I therefore provide an impact structure of the twin bar type, or at least having the general appearance of a twin bar structure, that is of decorative appearance, and which may, nevertheless, be formed at a minimum of expense, since only the intermediate section 11 need be highly finished, as above explained.

The intermediate section 11 is shown as provided with two grooves 15 in its face that serve not only to enhance the appearance of the structure but serve as recesses for the reception of the heads of bolts 16, by means of which the end bars 12 are secured to the middle bar 11. The bolts are thereby prevented from accidental turning and causing looseness in the assembly.

The bar 11 is also provided with holes through which bolts 17 extend for securing it to the outer ends of bracket arms 18. The bracket arms 18 are bent to semi-circular form to increase the resiliency of the structure and are secured at their inner portions to the ends of the vehicle frame members 10 by means of clamping plates 19 and screws 20. The bracket arms 18 are provided with recesses 21 for the reception of lugs 22 on the inner faces of the plates 19, thus effecting an interlocking engagement which will prevent shifting of the bracket arms upon the frame members 10, in directions longitudinally of the impact bars.

Not only are the bolts 16 prevented from turning by reason of the fact that they seat within the grooves 15 in the face of the impact section 11, but the nuts 23, by which the bolts are held in position, are of such dimension that they abut against the adjacent edges of the bracket arms 18, so that they will not turn accidentally, thus insuring permanent rigidity of connection as between the end sections 12 and the mid section 11. It will be understood that the bolts 16 and their nuts 23 will be secured in place before the impact structure 11—12 is fastened to the bracket arms 18 by the bolts 17.

It will thus be seen that notwithstanding the impact structure is composed of a plurality of sections (end and intermediate), such sections are so rigidly and permanently secured together that danger of loosening and rattling in service are avoided.

The end sections 12 may be of various sizes and weights and still form an accurate fit with respect to the middle bar 11, since such end bars will be punched with holes that will aline with the holes in the middle bar through which the bolts 16 extend. Therefore, the middle bars may be given a standard form and size and end sections 12 of various specifications may be readily employed with a standard middle section.

Referring now to Figs. 5 to 8, I show a structure involving a middle bar 11$^a$ which may be of the same general construction as the bar 11 of Figs. 1 to 3, but with the bolts 17 omitted. In this structure, the end sections 12$^a$ are secured to the middle section by bolts in substantially the same manner as in the case of Figs. 1 to 3, but instead of securing the impact structure to bracket arms 18$^a$, by means of bolts such as the bolts 17, I bend the inner ends of the bars 12$^a$ rearwardly and form eyes 24 therein for the reception of bolts 25 that extend through such eyes and through the eyes formed in the outer ends of the bracket arms 18$^a$, the outer ends of the bracket arms 18$^a$ being disposed between the eyes 24, so that a pivotal connection is formed therewith. The rear ends of the arms 18$^a$ are secured to a vehicle in any suitable manner.

In Fig. 9, I show a cross-sectional view of a middle bar or impact section 9$^b$ which, instead of being flat and grooved as are the bars 11 and 11$^a$, is of semi-cylindrical form over a portion of its face. The bar 9$^b$ may have such thickness as to be substantially rigid, or may be sufficiently thin to yield under impacts.

I claim as my invention:—

1. Bumper structure comprising an intermediate impact section having recesses in one face thereof, end sections abutting the other face of the intermediate section, and bolts extending through the ends of the intermediate section and the inner ends of the end sections for securing them together, the said bolts having heads fitting within the said recesses, the recesses and the said heads being of non-circular contour to prevent turning of the bolts.

2. Bumper structure comprising an intermediate impact section, end sections, bolts and nuts for securing said end sections to the impact sections, bracket members, and means for securing said sections to the bracket members, the bracket members being disposed in position to prevent turning movement of the nuts.

3. Bumper structure comprising an intermediate impact section, end sections, bolts and nuts for securing said end sections to the impact sections, bracket members, means for securing said sections to the bracket members, the bracket members being disposed in position to prevent turning movement of the nuts, and means on one of said sections for engaging the bolts to prevent turning movements thereof.

4. Bumper structure comprising an intermediate impact section, end sections composed of vertically-spaced bars at each end of the impact section, bolts extending through said intermediate section and said bars for securing them together, bracket arms secured to said intermediate section at points adjacent to the longitudinal center line thereof, the ends of the bracket arms being disposed between the bolts which secure the upper and lower bars of the end sections to the intermediate section.

5. Bumper structure comprising an intermediate impact section, end sections composed of vertically-spaced bars at each end of the impact section, bolts extending through said intermediate section and said bars for securing them together, bracket arms secured to said intermediate section at points adjacent to the longitudinal center line thereof, the ends of the bracket arms being disposed between the bolts which secure the upper and lower bars of the end sections to the intermediate section, and surfaces on said bracket arms and one of said sections in position to be engaged by sides of said nuts and bolts to prevent turning movement thereof.

6. Bumper structure comprising an intermediate impact section, end sections each composed of two vertically-spaced bars secured to the ends of the intermediate section, bracket members, and bolts for securing the intermediate section to the bracket members, the said bolts extending between the inner ends of the said bars.

7. The combination with a vehicle frame having a clamping bracket disposed across the front portion thereof, of a bracket arm having a portion disposed transversely of the vehicle frame and supported in said clamping bracket, and an interlocking lug connection between said bracket arm and bracket respectively, for preventing shifting of the bracket in the clamp, a forwardly extending portion on said bracket arm, and means for securing an impact bar thereto.

8. The combination with a vehicle frame having a clamping device adjacent to its forward end, of a bracket arm having its rear end portion secured by said clamping bracket, interlocking means between the arm and the bracket for preventing the arm shifting in the clamping bracket, an impact bar, and means for securing the impact bar to the forward end of the bracket arm.

9. Bumper structure comprising an intermediate impact section, and end section overlapping the intermediate section at one end thereof, one of said sections being composed of a single wide-faced bar and the other of two vertically-spaced parallel bars, a bracket arm for supporting the said bars, securing means carried by the wide-faced section and extending between the said vertically-spaced bars and having connection with the said bracket arm, and a second end impact section formed and mounted similarly to the first-named end section.

10. Bumper structure comprising an intermediate impact section composed of a single wide-faced bar, and an end section connected to each end of the said impact section, the end sections each being composed of vertically-spaced bars, and the upper and lower edges of said end sections being in substantial horizontal alinement with the upper and lower edges respectively of the intermediate section.

11. Bumper structure comprising an intermediate impact section, an end section connected to one end of the intermediate section, one of said sections being composed of a single wide-faced bar and the other section composed of vertically-spaced bars, a second end section formed and mounted similarly to the first-named end section, and means for connecting the sections to a supporting structure.

In testimony whereof I, the said WILLIAM R. McGOWEN, have hereunto set my hand.

WILLIAM R. McGOWEN.